May 11, 1965 A. B. CANFIELD 3,182,432
MACHINE FOR PACKAGING PRODUCTS IN A CONTROLLED ATMOSPHERE
Filed May 21, 1962 5 Sheets-Sheet 1
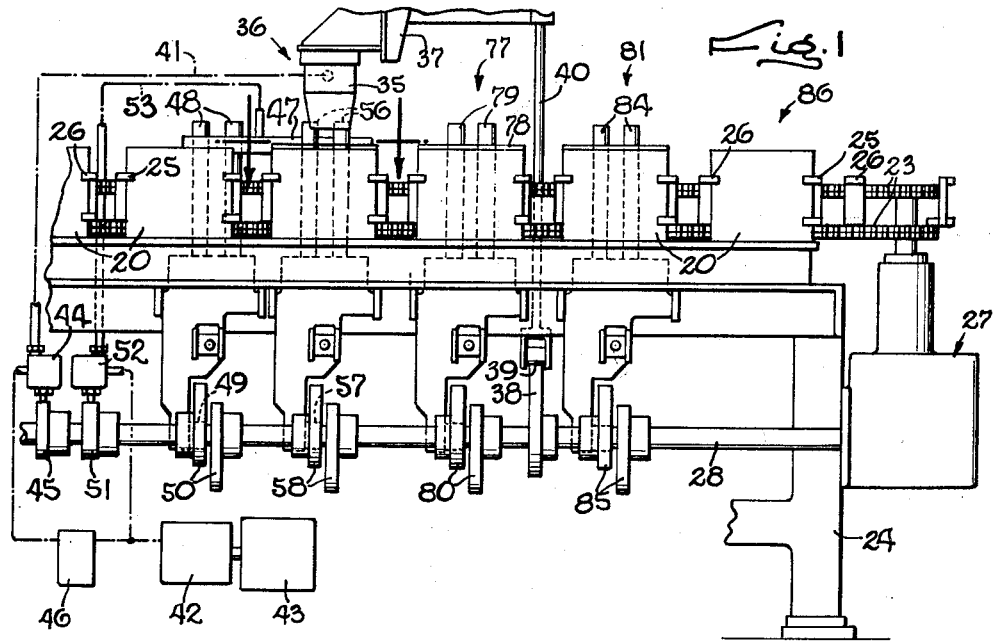
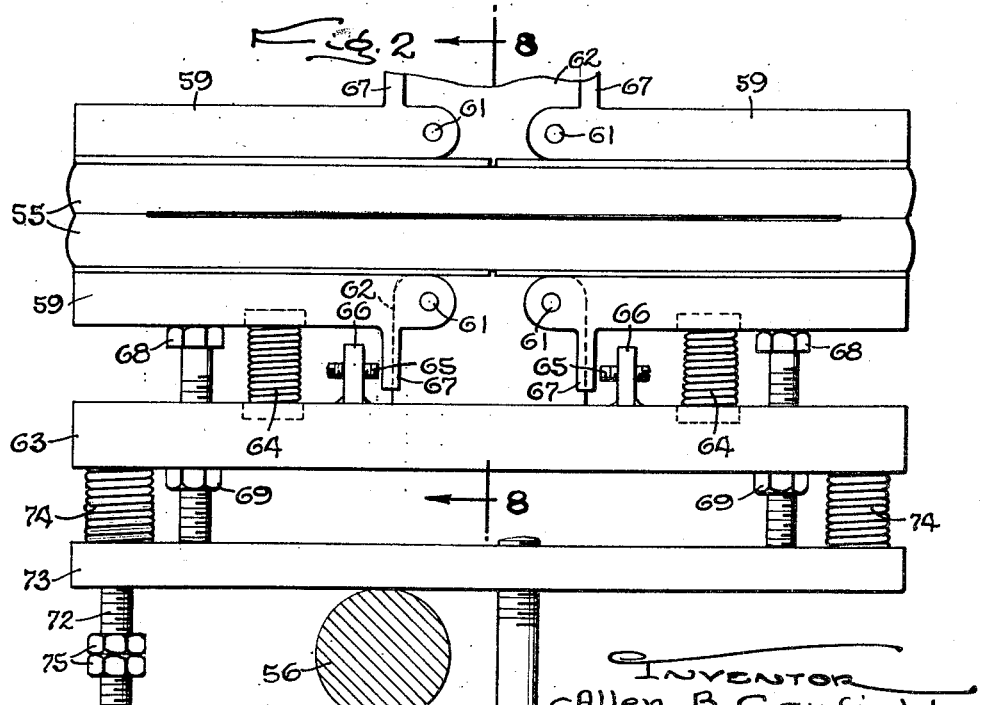
INVENTOR
Allen B. Canfield
by Wolfe, Hubbard, Voit & Osann
ATTORNEY

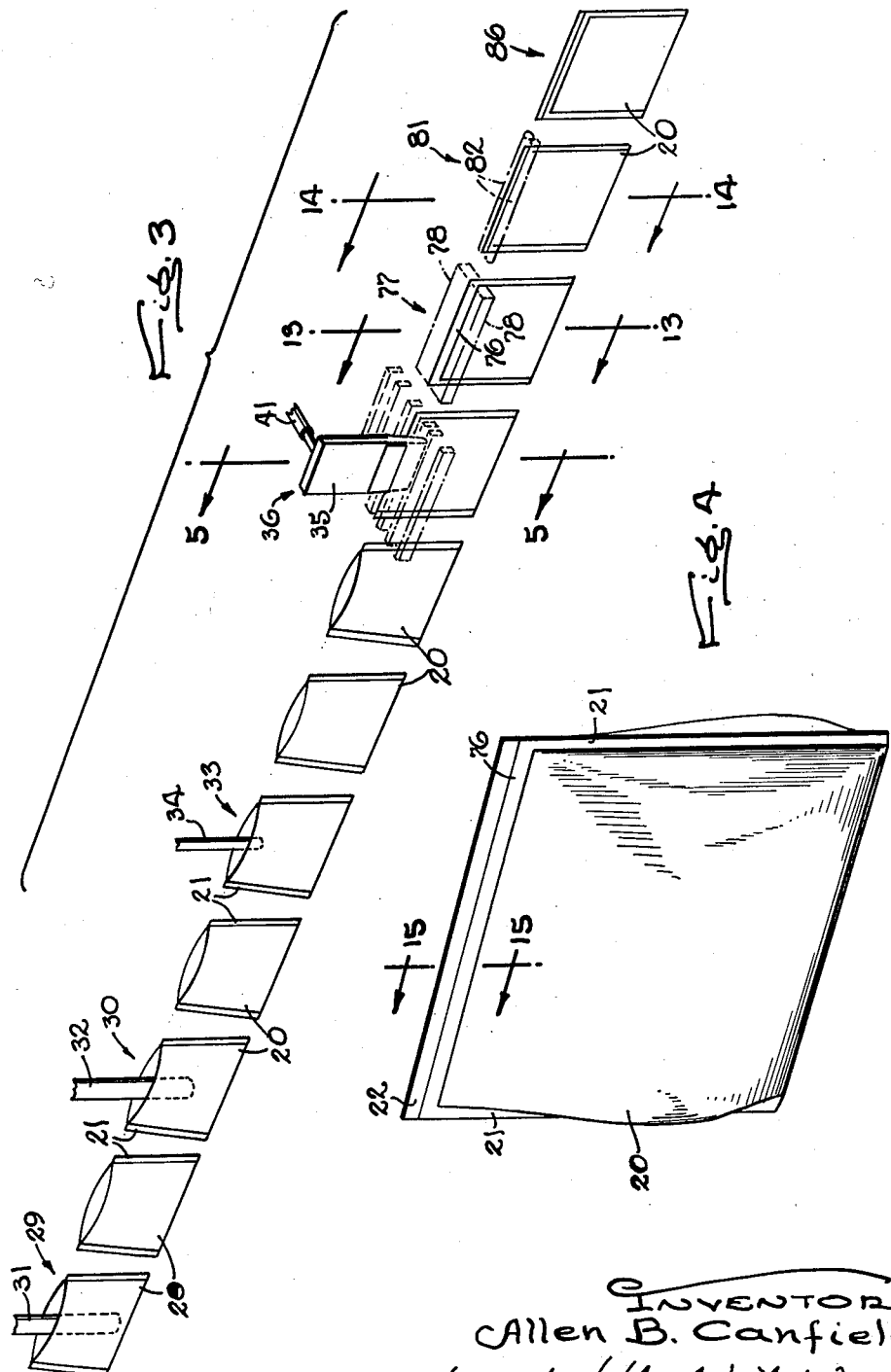

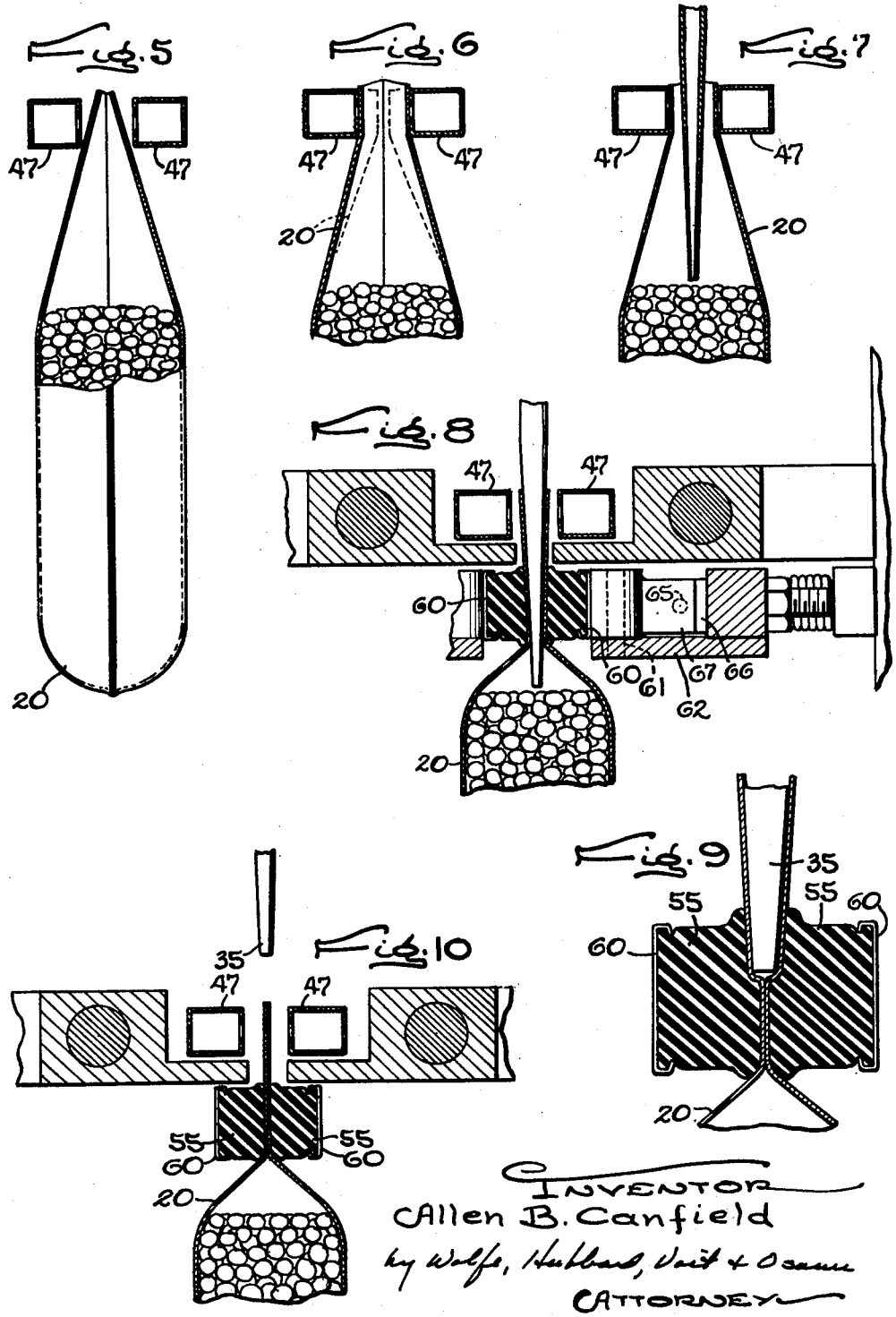

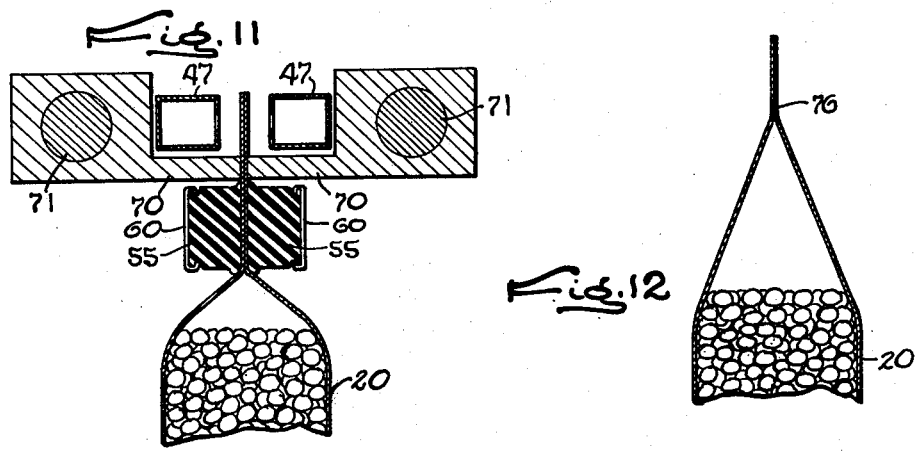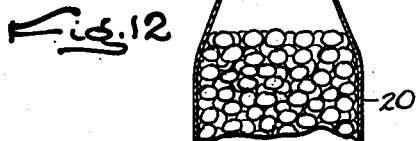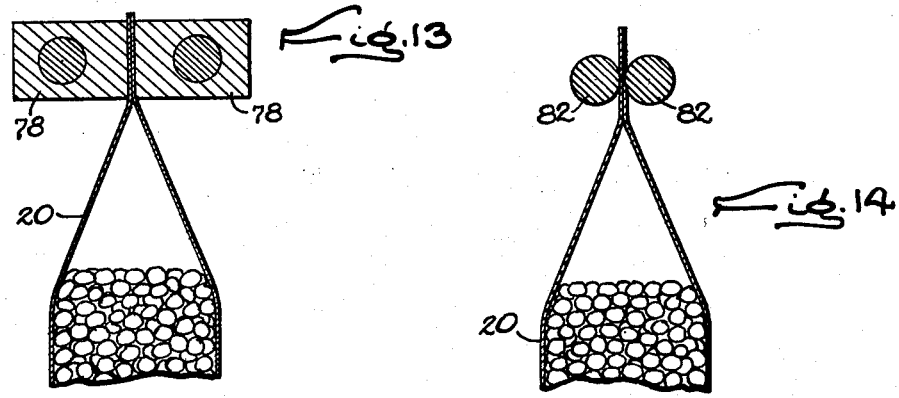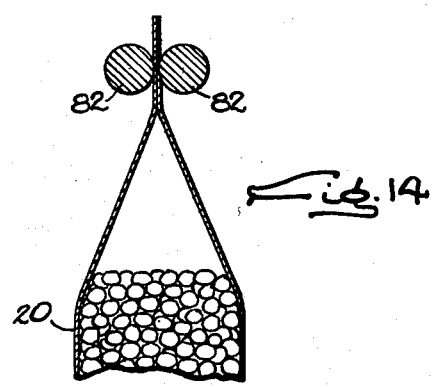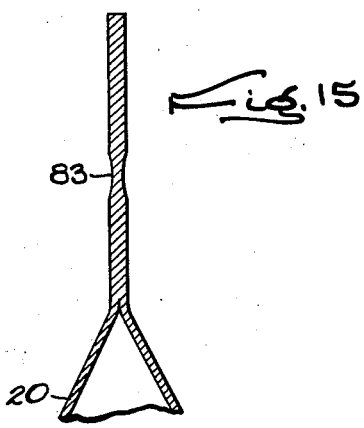

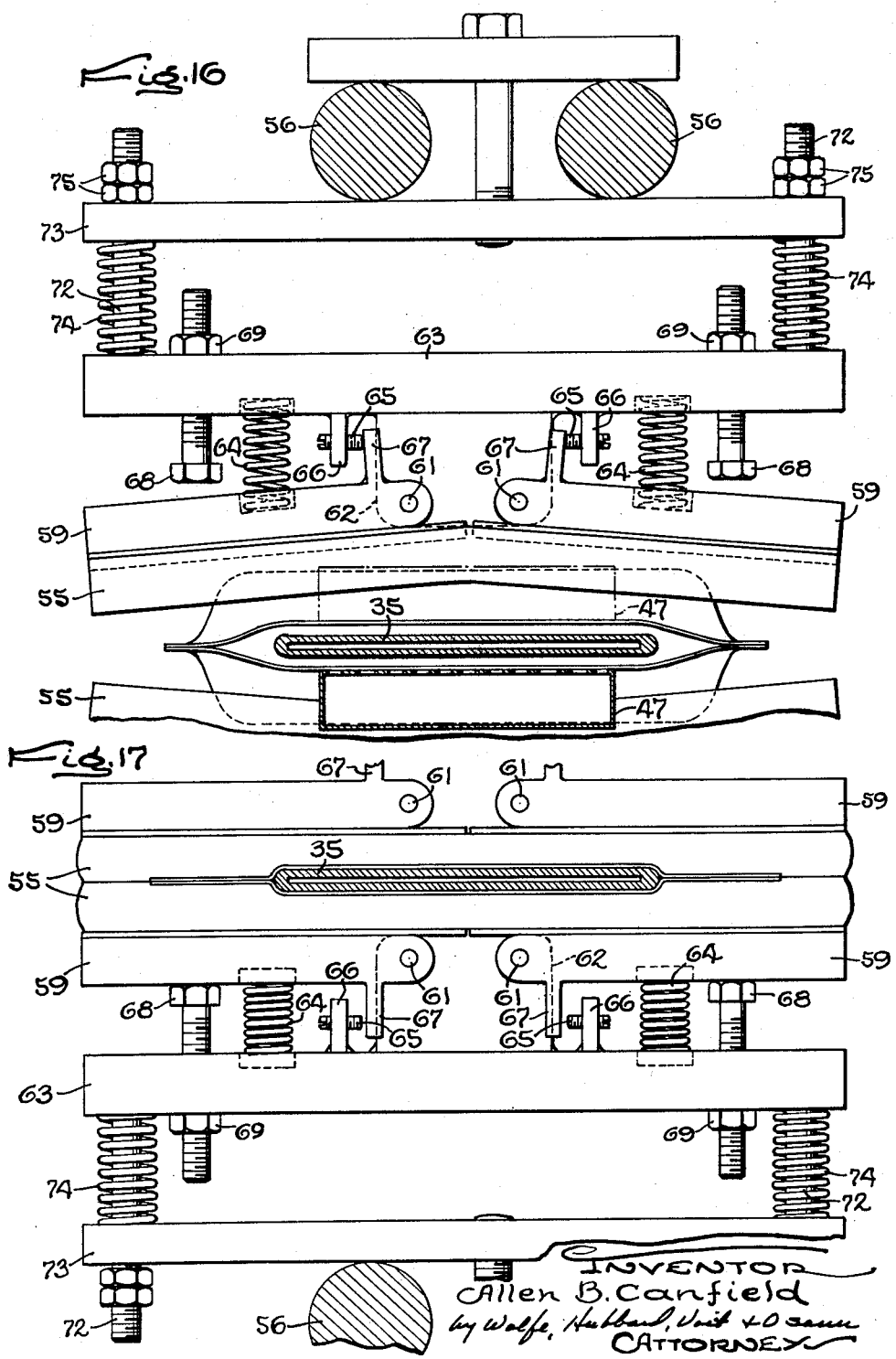

United States Patent Office 3,182,432
Patented May 11, 1965

3,182,432
MACHINE FOR PACKAGING PRODUCTS IN A CONTROLLED ATMOSPHERE
Allen B. Canfield, Rockford, Ill., assignor to Bartelt Engineering Company, Inc., Rockford, Ill., a corporation of Delaware
Filed May 21, 1962, Ser. No. 196,086
2 Claims. (Cl. 53—112)

This invention relates to a machine for packaging produocts in bags and, more particularly, to a machine in which the atmosphere within the bag is controlled as by exhausting at least part of the air in the bag. The invention has specific reference to packaging in a bag in the form of a pouch or envelope which is composed of two panels disposed face to face and heat sealed together to close the bag.

The general object of the invention is to provide in such a machine a novel mechanism which applies the desired atmosphere while holding the bag closed without exposing the interior to the outside atmosphere and which maintains the bag in this condition until the bag is sealed.

A more detailed object is to control the interior atmosphere through a tube whch is projected into the bag and to employ a novel mechanism which clamps the bag mouth around the tube and which holds the bag tightly closed while the tube is withdrawn and until the bag is sealed.

The invention also resides in the novel construction of the clamping mechanism by which the bag mouth is not only closed around the tube but is also held properly for the formation of the closing seal.

Other objects and advantages of the invention will become apparent from the following detailed description taken in connection with the accompanying drawings, in which FIGURE 1 is a fragmentary side elevation, with parts shown schematically, of a machine embodying the novel features of the present invention.

FIG. 2 is an enlarged fragmentary sectional view taken along the line 2—2 in FIG. 1 but with the parts in a moved position.

FIG. 3 is a schematic perspective view of the machine.

FIG. 4 is a perspective view of the completed package.

FIG. 5 is an enlarged fragmentary sectional view taken along the line 5—5 in FIG. 3.

FIG. 6 is a view similar to FIG. 5 but showing the parts in a moved position.

FIG. 7 is a view similar to FIG. 5 but showing the parts in a further moved position.

FIG. 8 is a fragmentary sectional view taken along the line 8—8 in FIG. 2 but showing the parts in a moved position.

FIG. 9 is an enlarged fragmentary view similar to FIG. 8 but showing the parts in a moved position.

FIG. 10 is a view similar to FIG. 8 but showing the parts in a still further moved position.

FIG. 11 is a view similar to FIG. 8 but showing the parts in a still further moved position.

FIG. 12 is an enlarged fragmentary sectional view of a bag immediately after it has been exhausted and initially sealed.

FIG. 13 is an enlarged fragmentary sectional view taken along the line 13—13 in FIG. 3.

FIG. 14 is an enlarged fragmentary sectional view taken along the line 14—14 in FIG. 3.

FIG. 15 is an enlarged fragmentary sectional view taken along the line 15—15 in FIG. 4.

FIG. 16 is an enlarged fragmentary sectional view taken along the line 2—2 in FIG. 1.

FIG. 17 is a view similar to FIG. 16 but showing the parts in a moved position.

As shown in the drawings for purposes of illustration, the invention is embodied in a machine for filling and closing bags 20 which may, as illustrated in FIG. 4, be formed by folding a sheet in half to form front and back panels sealed together along their side margins as indicated at 21. Various products including foods may be packaged in these bags and, herein, three products such as two vegetables and a small amount of fat are packaged in each bag. After the various products are deposited in the bag, the latter is closed by heat sealing the front and back panels of the bag together across the top of the bag as indicated at 22.

A machine of the general organization shown in U.S. Patent No. 2,649,674, issued to Harold L. Bartelt, is suitable for making, filling and closing bags of this type. In such a machine, the completed bags are advanced step by step and open end up along a horizontal path as illustrated schematically in FIG. 3 and are filled and closed during successive dwells at stations disposed along this path. To support and advance the bags, an endless chain 23 (FIG. 1) is mounted on an elongated horizontal base 24 with one run of the chain defining the horizontal path of the bags. A plurality of clamps 25 and 26 are carried by the chain and grip the leading and trailing side seals of each bag and hold the bags in spaced relation for edgewise advance. The chain 23 is advanced through steps slightly greater than the width of the bag by a Geneva mechanism 27 which is driven by an elongated shaft 28 journaled on the base 24, the shaft, in turn, being driven by a suitable motor (not shown). Herein, the chain moves the bags through stations 29 and 30 (FIG. 3) where fillers 31 and 32 deposit the two vegetables and then to a station 33 where the bag receives the fat from a filler 34.

Various products, including frozen foods, packaged in a bag 20 have improved shelf life if the atmosphere within the bag is controlled. The present invention contemplates the provision of a novel mechanism for controlling the atmosphere in the bag while closing the bag so that the product is sealed in the desired atmosphere. This mechanism includes a tube 35 which is projected into the open end of the bag to provide the requisite atmosphere and a device which closes the bag around the tube and keeps the bag closed while the tube is withdrawn and until the bag walls are sealed together. Herein, the atmosphere within the bag is controlled by partially exhausting the air so that the amount of oxygen in the bag after the latter is sealed is materially reduced.

To achieve the foregoing, the tube 35 is disposed at a station 36 along the path of the bags and after the last filling station 33 and is disposed above the bags while the latter are being advanced by the chain 23. During each dwell of the chain, the tube is lowered into the bag dwelling at the station 36, and for this purpose, the tube slides vertically on a bracket 37 rigid with the base. Raising and lowering of the tube in timed relation with the advance of the bags is achieved by a cam 38 fast on the shaft 28 and cooperating with a cam and follower 39 which, through an upright rod 40, slides the tube up and down on the bracket.

In cross section, the tube generally conforms to the interior of the bag, the tube being relatively flat and somewhat narrower than the overall width of the bag as shown most clearly in FIGS. 3 and 16. The lower end portion of the tube is tapered to facilitate insertion of the tube in the bag. The interior of the tube is connected through a suitable line 41 (FIG. 1) to a pump 42 driven by a motor 43. Interposed in the line 41 is a valve 44 which is actuated by a cam 45 on the shaft 28 and the arrangement is such that the cam opens the valve when the tube has been lowered into the bag so that the interior of the bag is exhausted by the pump 42 and the valve remains open at least until the bag mouth is closed tightly around the tube. Also in the line 41 is a liquid trap 46 which collects any liquids that might be drawn off during the exhausting operation.

To open the bag mouth preparatory to the insertion of the tube 35, vacuum manifolds 47 (FIGS. 1, 5, 6 and 7) are disposed on opposite sides of the bag adjacent the upper end thereof and are effective to draw the front and back panels of the bag apart. These manifolds may, as shown in the drawings, be in the form of elongated horizontal tubes which are square in cross section and are mounted on the upper ends of individual rocker arms 48. The latter are fulcrumed intermediate their ends on the base 24 and, at their lower ends, carry follower rolls 49 which engage cams 50 keyed to the shaft 28. The cams 50 are shaped to hold the manifolds apart during the advance of the chain 23 so that the bags may enter between the manifolds and into the station 36. During the initial part of the dwell of a bag at this station, the cams swing the manifolds together and against the upper end of the bag as shown in FIG. 6. At the same time, a cam 51 fast on the shaft 28 opens a valve 52 in a line 53 which connects the pump 42 with the interior of the manifolds thereby drawing a vacuum which, due to small holes 54 in the faces of the manifolds, creates a suction that holds the tops of the bag panels against the respective manifolds. Next, the cams 50 swing the manifolds apart, that is, from the broken line position to the full line position in FIG. 6, so that the mouth of the bag is held open for the exhauster tube 35.

Once the tube has been lowered into the bag, the cam 51 closes the valve 52 thereby releasing the bag panels from the vacuum manifolds 47 and then the top of the bag is clamped tightly around the tube so that the interior of the bag may be exhausted. To accomplish this, the machine employs a clamping device which includes two bars 55 (FIGS. 8 and 16) made of a resiliently yieldable material such as rubber. The clamping bars 55 are disposed on opposite sides of the bag below the manifolds 47 and are moved together to press the upper end portion of the bag panels against the exhauster tube 35. Because of the yieldable nature of the bars, the latter conform to the contour of the tube as shown in FIG. 17 and thereby not only hold the bag panels tightly against the tube but also close the bag on opposite sides of the tube.

The clamping bars 55 are supported on the upper ends of generally upright rocker arms 56 which, like the rocker arms 48, are fulcrumed intermediate their ends on the base 24 and carry follower rolls 57 at their lower ends to cooperate with cams 58 on the shaft 28. Supporting each bar 55 on the corresponding rocker arm are two backing members 59 (FIG. 17), these members being disposed end to end whereby each backs one half of the bar. Each backing member carries on its front side a shallow channel 60 which receives and mounts the clamping bar 55. Adjacent their inner ends, the backing members are pivotally connected at 61 to a forwardly projecting boss 62 on a block 63 which is carried on the upper end of the associated rocker arm 56. The pivots 61 permit the backing members to swing about generally upright axes and thus permit each bar 55 to flex from the bowed position shown in FIG. 16 to the straightened position in FIG. 17. The bar is urged toward the bowed position by compression springs 64 acting between the backing members and the block 63 and such bowing is limited by screw stops 65 threaded through ears 66 on the block and engaging fingers 67 on the backing members.

As the two rocker arms 56 are swung together, the ends of the clamping bars 55 engage each other and, thereafter, continued swinging of the rocker arms tends to straighten the bars against the action of the springs 64. Finally, the bars are completely straightened as shown in FIG. 17, this position being achieved when the backing members engage stops 68 in the form of bolts threaded through the block 63 and onto nuts 69. At this time, the bag mouth is tightly closed around the tube 35. Because of the bowing and progressive straightening of the bars 55, such clamping is achieved without wrinkling the bag panels since, as the bars straighten, they tend to stretch the bag mouth. Once the bars 55 are in the clamping position, the valve 44 may be opened to connect the tube 55 to the pump 42 and exhaust the interior of the bag. After the bag has been exhausted, the tube is raised out of the bag by the cam 38. During the withdrawal of the tube, the bag is held tightly closed by the yieldable clamping bars 55 which, as shown in FIG. 9, close in under the tube and hold the bag panels against each other across the full width of the bag.

When the exhauster tube 35 is completely withdrawn and while the bag is still held closed by the clamping bars 55, the top of the bag is heat sealed closed by sealing bars 70 (FIG. 11) which project in between the vacuum manifolds 47 and the bars 55. The sealing bars are maintained at the proper temperature for heat sealing by heaters 71 embedded in the bars and the latter are carried by the same rocker arms 56 which support the clamping bars.

In order that the sealing bars engage the bag panels after the bag mouth has been first gripped by the clamping bars 55 and after the exhauster tube 35 is withdrawn, the clamping bars are supported on the rocker arms 56 through the medium of a lost motion connection. The latter is formed by mounting the blocks 63 which support the clamping bars to slide on the rocker arms through the medium of bolts 72 which are rigid with the blocks and project rearwardly through plates 73 secured to the upper ends of the rocker arms. Compression springs 74 encircling the bolts and acting between the blocks 63 and the plates 73 urge the blocks forward as limited by nuts 75 threaded on the bolts and thus project the clamping bars in front of the sealing bars which are rigidly attached to the plates 73 (see FIG. 8).

With the foregoing arrangement, initial swinging of the rocker arms 56 by the cams 58 moves the bars 55 into clamping engagement with the bag top. At this time, the sealing bars 70 are disposed behind the faces of the clamping bars and out of contact with the bag as shown in FIG. 8. Upon withdrawal of the exhauster tube 35, the cams 58 produce a continued swinging of the rocker arms, this being permitted by compression of the springs 74 (see FIG. 2). Such continued swinging brings the faces of the sealing bars 70 into engagement with the bag panels and produces a narrow heat seal 76 (FIG. 12) across the full width of the bag mouth. This heat seal is made after the bag has been exhausted through the tube 35 and without opening the interior of the bag to the atmosphere so that the seal then maintains the evacuated condition of the bag.

After the seal 76 is formed, the rocker arms 56 swing back and the chain 23 advances the bag to the next station 77. At this station, the wider, more permanent seal 22 (FIG. 4) is superimposed over the seal 76 and is formed in generally the same manner as the closing seal is made in the aforesaid Bartelt patent. Thus, horizontal sealing bars 78 (FIGS. 1 and 13) are supported on the upper ends of upright rocker arms 79 and are swung together by cams 80 on the shaft 28. The bag then is advanced to the next station 81 where the top seal may be crimped between rods 82 (FIG. 14) which squeeze the center of the seal as shown at 83 in FIG. 15 and insure the air-tightness of the bag. The rods 82, like the heat sealing bars 78 are mounted on rocker arms 84 and swing together by cams 85 on the shaft 28. At the final station 86, the clamps 25 and 26 are opened and the completed bag removed.

It will be observed that, with the machine constructed in accordance with the invention, the interior of a bag 20 may be provided with a controlled atmosphere and the bag is sealed while maintaining this atmosphere. The cooperation of the clamping bars 55 and the tube 35 permit the required atmosphere to be obtained without opening the bag to the outside atmosphere and this condition is maintained until the bag is permanently closed by the heat seal 76. Moreover, this is achieved by constructing the clamping bars 55 in a novel manner so that the bag is clamped without wrinkling or otherwise destroying the appearance of the bag mouth.

I claim as my invention:

1. Mechanism for operating on bags comprising, a base, means on said base supporting a filled bag open end up, a generally upright tube mounted on said base to reciprocate vertically into and out of said bag through the open end thereof, means for flowing a gas through said tube when the tube is projected into the bag, two supports disposed on opposite sides of said bag and mounted on said base to move toward and away from each other, a pair of horizontally elongated pads, one mounted on each of said supports adjacent the upper end of the bag to oppose the other of said pads, said pads being made of a resiliently deformable material, two horizontally elongated sealing bars, one mounted on each of said supports and opposing each other, said bars being vertically spaced from said pads and disposed behind the associated pad, a lost motion connection between each of said pads and the corresponding one of said bars operable first to clamp the bag between said pads upon movement of said supports toward each other and to cause said bars to engage the bag upon continued movement of the supports, and mechanism for raising said tube after the bag is engaged by said pads but before engagement by said bars.

2. In a machine for operating on bags, the combination of, a base, means on said base supporting a filled bag open end up, a generally upright tube mounted on said base to reciprocate vertically into and out of said bag through the open end thereof, two supports disposed on opposite sides of said bag and mounted on said base to move toward and away from each other, a first pair of horizontally elongated backing members disposed end to end and pivotally mounted at their adjacent ends on one of said supports to turn about generally upright axes, a second pair of backing members similarly mounted on the other of said supports, two horizontally elongated pads, one mounted on and extending across the combined lengths of each pair of backing members whereby each pad is bowed upon turning of the corresponding backing members, said pads providing opposed clamping surfaces, means yieldably urging the free ends of said backing members toward said bag thereby to give said clamping surfaces a concave curvature, mechanism operable to move said supports together whereby said pads first clamp the bag at the edges thereof and thereafter the pads straighten progressively to clamp the bag around said tube and across the full width of the bag, said pads stretching said bags upon withdrawal of said tube.

References Cited by the Examiner
UNITED STATES PATENTS

| | | | |
|---|---|---|---|
| 1,968,190 | 7/34 | Clark | 53—33 |
| 2,559,368 | 7/51 | Pancratz | 53—373 X |
| 2,649,674 | 8/53 | Bartelt | 53—186 X |
| 2,672,268 | 3/54 | Bower | 53—373 X |
| 2,840,964 | 7/58 | Kissling | 53—112 X |
| 2,889,673 | 6/59 | Rockland et al. | 53—112 |

FRANK E. BAILEY, *Primary Examiner.*

TRAVIS S. McGEHEE, *Examiner.*